(Model.)
G. W. MELOTTE.
FORCEPS.
No. 370,204. Patented Sept. 20, 1887.
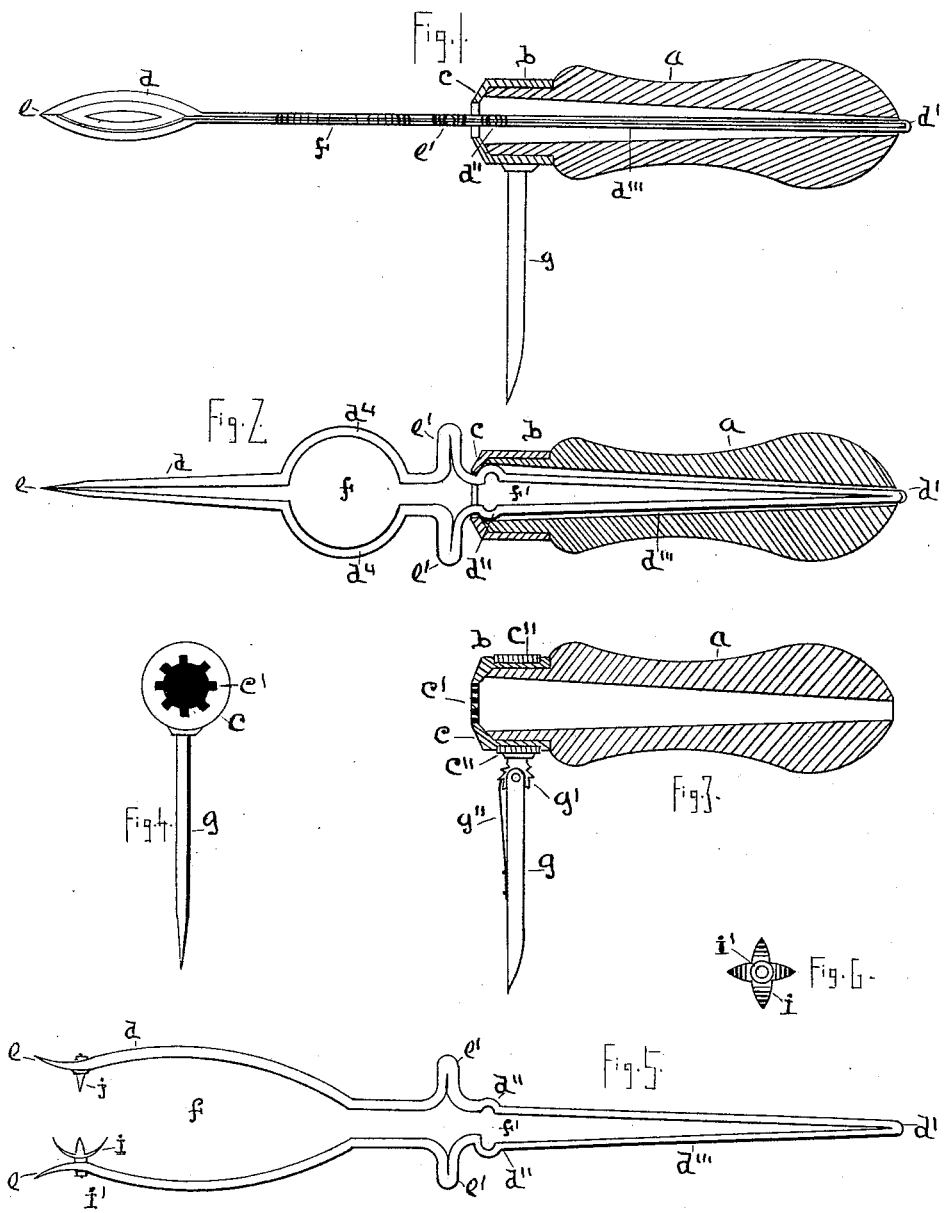
Sheridan Slocum.
Walter Stephens.
Witnesses.
Geo. W. Melotte.
Inventor.
N. PETERS, Photo-Lithographer, Washington, D. C.

UNITED STATES PATENT OFFICE.

GEORGE W. MELOTTE, OF ITHACA, NEW YORK.

FORCEPS.

SPECIFICATION forming part of Letters Patent No. 370,204, dated September 20, 1887.

Application filed December 27, 1886. Serial No. 222,743. (Model.)

*To all whom it may concern:*

Be it known that I, GEORGE W. MELOTTE, a citizen of the United States, residing at Ithaca, Tompkins county, New York, have invented an Improved Laboratory Forceps, of which the following is a specification, reference being had to the accompanying drawings.

My invention relates to the mode of construction of my forceps, as will be apparent as I describe my invention.

Figure 1 is a side elevation, partially sectional, of my forceps. Fig. 2 is a view looking down on it, as seen in Fig. 1. Fig. 3 is a side elevation of its detached handle, its ferrule, and an adjustable pin or holding point. Fig. 4 is an end view of the ferrule with a fixed pin-point. Fig. 5 is a view of the forceps detached from the handle with a toothed cup or holder at its point; and Fig. 6 is the toothed cup, seen from above.

In the figures, $a$ is the handle of my forceps, and $b$ its ferrule, which ferrule is peculiar in having a lip, $c$, which is bent or inclined downward at its front end, in order to hold the forceps in its handle.

The forceps $d$ are made with two blades or sides, which are fast to each other at the end $d'$, and the ends $e$ spring apart, as shown in Fig. 5. From the outward-bent spurs $e'$ or cross-bar to their ends $e$ the forceps are shaped to suit the work to be done by them, yet retaining the flask or other holding space or enlargement $f$, Figs. 2 and 5. The spurs $e'$, the bulges $d''$, and the right-hand ends to $d'$ are made as shown in Figs. 2 and 5, in all uses of them. The part which is put into the handle is not attached to it, but is loose, and is held by its spring elasticity when it expands the bulges $d''$ outward, so that the bulges catch within the lip $c$, whence the fingers of the user of the forceps, by a little pressure on the spurs or cross-bar $e'$ or on the enlarged parts $f$, disengage them at pleasure. Thus the forceps are easily slid into and taken out of the handle. The united action of the bulges and lip holds the article in the ends $e$ fast as long as the forceps are in the handle. The bulges and cross-bar foldings $e'$ on each blade of the forceps limit the distance which the handle portions go into the handle, and the spurs of the cross-bar are convenient means of rotating the forceps in the handle, and they are the means by which the forceps are pushed into or pulled out of the handle. The lip, as I usually make it, is smooth, and allows rotation in either direction, and thus the article held in the end $e$ is turned either way to suit the best position for blowpipe action when held over a piece of charcoal or in a hot flame; but the rotation needs in certain cases to be retarded or stopped; hence I make teeth or roughnesses $c'$ in the end of the lip $c$, as seen in Figs. 3 and 4. As before intimated, the space $f$ is made a half in each blade for the holding of certain articles—as, for example, test-tubes or crucibles. From this space, toward the left hand, the blades approach each other until they meet in the end $e$, which may be shaped to fine points, or be hollow, or have other special forms. These ends I often make of platinum, that the heat may not melt them, or they be affected by acids.

In Fig. 4 a point, pin, or standard, $g$, extends from a ring, $c''$, about the ferrule downward, and it is for making the handle of the forceps fast to a piece of charcoal when a blowpipe is used, or to secure the forceps and any article in it to any convenient place. This support may be made fast to the ferrule, as shown in Fig. 1; but I prefer it to be adjustable to diverse positions. Hence I make often not only the ring $c''$ about the ferrule $b$, but I make a hinged upper end to this standard, with teeth or notches, in which a spring-pawl, $g''$, acts to hold the handle and forceps at any angle convenience may require. There is a middle space, $f'$, between the blades, which allows the forceps, while holding an article, to be pressed together, that the bulges $d''$ may pass the lip $c$, and thus release the forceps from the handle.

In Fig. 5 at $i$ is a cup made with three or four points, which is loosely attached to one blade of the forceps by the bolt-pin $i'$, on which the cup and its contained article can be revolved while being acted on by the blow-pipe, and a point, $j$, is on the other blade, which comes down on the article in the cup. All other parts of my forceps are believed to be apparent.

What I claim is—

1. In a pair of forceps, the handle $a$ and the lip $c$ of the ferrule $b$, in combination with the bulging or cam surfaces $d''$ of the forceps-blades.

2. In a pair of forceps, the supporting pin or standard $g$, provided with the hinge $g'$, toothed surface $c'$, and spring-pawl $g''$.

3. In a pair of forceps, the standard $g$, in combination with the ferrule $b$, handle $a$, and forceps-blades.

4. In a pair of forceps, the divided cross-bar $e$, in combination with the ferrule $b$, handle $a$, and the part $d'''$ of the forceps.

5. In a pair of forceps, a ferrule with a lip, $c$, in combination with the toothed surface $c'$ and the blades of the forceps.

6. The combination, in a pair of forceps, of the toothed surface $c'$, lip $c$, loop-space $f$ and cross-bar $e'$, and handle $a$.

7. In a pair of forceps, the revolving cup $i$, and holding-pin $j$ on the grasping ends $e$ of the blades of a forceps.

GEO. W. MELOTTE.

Witnesses:
S. J. PARKER,
SHERIDAN SLOCUM.